United States Patent [19]
Wright et al.

[11] Patent Number: 6,101,599
[45] Date of Patent: Aug. 8, 2000

[54] SYSTEM FOR CONTEXT SWITCHING BETWEEN PROCESSING ELEMENTS IN A PIPELINE OF PROCESSING ELEMENTS

[75] Inventors: Michael L. Wright; Kenneth Michael Key, both of Raleigh, N.C.; Darren Kerr, Palo Alto, Calif.; William E. Jennings, Cary, N.C.

[73] Assignee: Cisco Technology, Inc., San Jose, Calif.

[21] Appl. No.: 09/106,244

[22] Filed: Jun. 29, 1998

[51] Int. Cl.[7] .............................. G06F 11/08; G06F 15/16
[52] U.S. Cl. .......................................... 712/228; 709/108
[58] Field of Search .............................. 709/108; 712/228, 712/21, 28, 32; 714/2, 6, 11, 13, 15

[56] References Cited

U.S. PATENT DOCUMENTS

| | | | |
|---|---|---|---|
| 4,590,554 | 5/1986 | Glazer et al. | 364/200 |
| 4,598,400 | 7/1986 | Hillis | 370/60 |
| 4,709,327 | 11/1987 | Hillis et al. | 364/200 |
| 4,773,038 | 9/1988 | Hillis et al. | 364/900 |
| 4,791,641 | 12/1988 | Hillis | 371/38 |
| 4,805,091 | 2/1989 | Thiel et al. | 364/200 |
| 4,809,202 | 2/1989 | Wolfram | 364/578 |
| 4,870,568 | 9/1989 | Kahle et al. | 364/200 |
| 4,922,486 | 5/1990 | Lidinsky et al. | 370/427 |
| 4,954,988 | 9/1990 | Robb | 365/189.02 |
| 4,965,717 | 10/1990 | Cutts, Jr. et al. | 364/200 |
| 4,993,028 | 2/1991 | Hillis | 371/39.1 |
| 5,070,446 | 12/1991 | Salem | 395/500 |
| 5,111,198 | 5/1992 | Kuszmaul | 340/825.52 |
| 5,113,510 | 5/1992 | Hillis | 395/425 |
| 5,117,420 | 5/1992 | Hillis et al. | 370/60 |
| 5,129,077 | 7/1992 | Hillis | 395/500 |
| 5,148,547 | 9/1992 | Kahle et al. | 395/800 |
| 5,151,996 | 9/1992 | Hillis | 395/800 |
| 5,157,663 | 10/1992 | Major et al. | 371/9.1 |
| 5,175,865 | 12/1992 | Hillis | 395/800 |
| 5,212,773 | 5/1993 | Hillis | 395/200 |
| 5,222,216 | 6/1993 | Parish et al. | 395/275 |
| 5,222,237 | 6/1993 | Hillis | 395/650 |
| 5,247,613 | 9/1993 | Bromley | 395/200 |
| 5,247,694 | 9/1993 | Dahl | 395/800 |
| 5,255,291 | 10/1993 | Holden et al. | 375/111 |
| 5,261,105 | 11/1993 | Potter et al. | 395/725 |
| 5,265,207 | 11/1993 | Zak et al. | 395/200 |
| 5,274,631 | 12/1993 | Bhardwaj | 370/401 |
| 5,289,156 | 2/1994 | Ganmukhi | 340/146.2 |
| 5,295,258 | 3/1994 | Jewett et al. | 395/575 |
| 5,301,310 | 4/1994 | Isman et al. | 395/575 |
| 5,317,726 | 5/1994 | Horst | 395/575 |
| 5,325,487 | 6/1994 | Au | 711/131 |
| 5,349,680 | 9/1994 | Fukuoka | 709/108 |
| 5,355,492 | 10/1994 | Frankel et al. | 395/700 |
| 5,357,612 | 10/1994 | Alaiwan | 395/200 |
| 5,361,363 | 11/1994 | Wells et al. | 395/800 |
| 5,367,692 | 11/1994 | Edelman | 395/800 |
| 5,388,214 | 2/1995 | Leiserson et al. | 395/200 |
| 5,388,262 | 2/1995 | Hillis | 395/650 |
| 5,390,298 | 2/1995 | Kuszmaul et al. | 395/200 |
| 5,404,296 | 4/1995 | Moorhead | 364/421 |
| 5,404,562 | 4/1995 | Heller et al. | 395/800 |
| 5,455,932 | 10/1995 | Major et al. | 395/489 |
| 5,485,627 | 1/1996 | Hillis | 395/800 |

(List continued on next page.)

*Primary Examiner*—Eric Coleman
*Attorney, Agent, or Firm*—Cesari and McKenna, LLP

[57] ABSTRACT

A system and technique facilitate fast context switching among processor complex stages of a pipelined processing engine. Each processor complex comprises a central processing unit (CPU) core having a plurality of internal context switchable registers that are connected to respective registers within CPU cores of the pipelined stages by a processor bus. The technique enables fast context switching by sharing the context switchable registers between upstream and downstream CPUs to, inter alia, force program counters into the downstream registers. In one aspect of the inventive technique, the system automatically reflects (shadows) the contents of an upstream CPU's context switchable registers at respective registers of a downstream CPU over the processor bus. In another aspect of the invention, the system redirects instruction execution by the downstream CPU to an appropriate routine based on processing performed by the upstream CPU.

16 Claims, 8 Drawing Sheets

U.S. PATENT DOCUMENTS

| | | | |
|---|---|---|---|
| 5,530,809 | 6/1996 | Doulas et al. | 395/200.2 |
| 5,535,408 | 7/1996 | Hillis | 395/800 |
| 5,561,669 | 10/1996 | Lenney et al. | 370/60.1 |
| 5,568,380 | 10/1996 | Broadnax | 700/79 |
| 5,617,538 | 4/1997 | Heller | 395/200.02 |
| 5,621,885 | 4/1997 | Del Vigna, Jr. | 395/182.11 |
| 5,627,965 | 5/1997 | Liddell et al. | 395/185.01 |
| 5,673,423 | 9/1997 | Hillis | 395/553 |
| 5,710,814 | 1/1998 | Klemba et al. | 380/9 |
| 5,742,604 | 4/1998 | Edsall et al. | 370/401 |
| 5,748,936 | 5/1998 | Karp | 712/218 |
| 5,751,955 | 5/1998 | Sonnier et al. | 395/200.19 |
| 5,764,636 | 6/1998 | Edsall | 370/401 |
| 5,787,243 | 7/1998 | Stiffler | 714/13 |
| 5,787,255 | 7/1998 | Parlan et al. | 395/200.63 |
| 5,812,811 | 9/1998 | Dubey | 712/216 |
| 5,838,915 | 11/1998 | Klausmeier et al. | 395/200.45 |
| 5,872,963 | 2/1999 | Bitar | 712/233 |

SYSTEM FOR CONTEXT SWITCHING BETWEEN PROCESSING ELEMENTS IN A PIPELINE OF PROCESSING ELEMENTS

CROSS-REFERENCE TO RELATED APPLICATIONS

This invention is related to the following copending U.S. patent applications:

U.S. patent application Ser. No. 09/106,478 titled, PROGRAMMABLE ARRAYED PROCESSING ENGINE ARCHITECTURE FOR A NETWORK SWITCH;

U.S. patent application Ser. No. 09/106,436 titled, ARCHITECTURE FOR A PROCESSOR COMPLEX OF AN ARRAYED PIPELINED PROCESSING ENGINE; and U.S. patent application Ser. No. 09/106,246 titled, SYNCHRONIZATION AND CONTROL SYSTEM FOR AN ARRAYED PROCESSING ENGINE, each of which was filed on even date herewith and assigned to the assignee of the present invention.

FIELD OF THE INVENTION

The present invention relates to a processing engine of a computer network switch and, in particular, to context switching among processing elements of such a processing engine.

BACKGROUND OF THE INVENTION

Computer architecture generally defines the functional operation, including the flow of information and control, among individual hardware units of a computer. One such hardware unit is the processor or processing engine which contains arithmetic and logic processing circuits organized as a set of data paths. In some implementations, the data path circuits may be configured as a central processing unit (CPU) having internal registers for use with operations that are defined by a set of instructions. The instructions are typically stored in an instruction memory and specify a set of hardware functions that are available on the CPU. When implementing these functions, the CPU generally retrieves "transient" data from a data memory, loads the data into its internal registers, processes the data in accordance with the instructions and then stores the processed data back in data memory.

A high-performance computer may be realized by using a number of identical CPUs or processors to perform certain tasks in parallel. For a purely parallel multiprocessor architecture, each processor may have shared or private access to non-transient data, such as program instructions (e.g., algorithms) stored in a memory coupled to the processor. Access to an external memory is generally inefficient because the execution capability of each processor is substantially faster than its external interface capability; as a result, the processor often idles while waiting for the accessed data. Moreover, scheduling of external accesses to a shared memory is cumbersome because the processors may be executing different portions of the program. On the other hand, providing each processor with private access to the entire program results in inefficient use of its internal instruction memory.

In an alternative implementation, the data paths may be configured as a pipeline having a plurality of processor stages. This multiprocessor configuration conserves internal memory space since each processor executes only a small portion of the program algorithm. For example, a first portion of the program code may instruct a first CPU to examine some data, a second portion of the program may instruct a second CPU to determine the nature of the data and a third portion may instruct a third CPU to jump to an appropriate routine to execute the data. Since the first CPU has performed meaningful work on the data, it would be desirable to allow the downstream (second and third) CPUs to take advantage of that work. A drawback to this desired approach, however, is the difficulty in apportioning the program into different phases of equivalent duration to ensure synchronized switching of "context" processing among the stages.

Another drawback of the typical pipeline engine is the overhead incurred in transferring data as intermediate result values from one processor to the next in a high-bandwidth application. For example, assume an upstream CPU has performed a binary tree look-up operation and has a pointer to a next address that is to be retrieved. A downstream CPU may be responsible for executing the portion of the program that requires that next address (e.g., an intermediate result) during a next context switch of the engine. Typically, the upstream CPU stores the pointer in the data memory where it can be retrieved by the downstream CPU when performing its look-up operation. The downstream CPU may execute a load operation to retrieve the pointer and load it into one of its internal registers. Such a process is inefficient in that it consumes CPU cycles for overhead operations rather than actual data processing.

An example of a high-bandwith application suitable for use in transferring intermediate results among processors involves the area of data communications and, in particular, the use of a parallel, multiprocessor architecture as the processing engine for an intermediate network station. The intermediate station interconnects communication links and subnetworks of a computer network to enable the exchange of data between two or more software entities executing on hardware platforms, such as end stations. The stations typically communicate by exchanging discrete packets or frames of data according to predefined protocols, such as the Transmission Control Protocol/Internet Protocol (TCP/IP), the Internet Packet Exchange (IPX) protocol, the AppleTalk protocol or the DECNet protocol. In this context, a protocol consists of a set of rules defining how the stations interact with each other.

A router is an intermediate station that implements network services such as route processing, path determination and path switching functions. The route processing function determines the type of routing needed for a packet, whereas the path switching function allows a router to accept a frame on one interface and forward it on a second interface. The path determination, or forwarding decision, function selects the most appropriate interface for forwarding the frame. A switch is also an intermediate station that provides the basic functions of a bridge including filtering of data traffic by medium access control (MAC) address, "learning" of a MAC address based upon a source MAC address of a frame and forwarding of the frame based upon a destination MAC address. Modern switches further provide the path switching and forwarding decision capabilities of a router. Each station includes high-speed media interfaces for a wide range of communication links and subnetworks.

The hardware and software components of these stations generally comprise a communications network and their interconnections are defined by an underlying architecture. Modern communications network architectures are typically organized as a series of hardware and software levels or "layers" within each station. These layers interact to format data for transfer between, e.g., a source station and a destination station communicating over the internetwork. Predetermined services are performed on the data as it passes through each layer and the layers communicate with each other by means of the predefined protocols. Examples of communications architectures include the IPX communications architecture and, as described below, the Internet communications architecture.

The Internet architecture is represented by four layers which are termed, in ascending interfacing order, the network interface, internetwork, transport and application layers. These layers are arranged to form a protocol stack in each communicating station of the network. The lower layers of the stack provide internetworking services and the upper layers collectively provide common network application services. For example, the network interface layer comprises physical and data link sublayers that define a flexible network architecture oriented to the implementation of local area networks (LANs). Specifically, the physical layer is concerned with the actual transmission of signals across the communication medium and defines the types of cabling, plugs and connectors used in connection with the medium. The data link layer ("layer 2") is responsible for transmission of data from one station to another and may be further divided into two sublayers: logical link control (LLC) and MAC sublayers.

The MAC sublayer is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link MAC address. This MAC address is unique for each station interfacing to a LAN. The LLC sublayer manages communications between devices over a single link of the internetwork.

The primary network layer protocol of the Internet architecture is the Internet protocol (IP) contained within the internetwork layer ("layer 3"). IP is a network protocol that provides internetwork routing and relies on transport protocols for end-to-end reliability. An example of such a transport protocol is the Transmission Control Protocol (TCP) contained within the transport layer. The term TCP/IP is commonly used to refer to the Internet architecture. Protocol stacks and the TCP/IP reference model are well-known and are, for example, described in *Computer Networks* by Andrew S. Tanenbaum, printed by Prentice Hall PTR, Upper Saddle River, N.J., 1996.

Data transmission over the network therefore consists of generating data in, e.g., a sending process executing on the source station, passing that data to the application layer and down through the layers of the protocol stack where the data are sequentially formatted as a frame for delivery over the medium as bits. Those frame bits are then transmitted over the medium to a protocol stack of the destination station where they are passed up that stack to a receiving process. Although actual data transmission occurs vertically through the stacks, each layer is programmed as though such transmission were horizontal. That is, each layer in the source station is programmed to transmit data to its corresponding layer in the destination station. To achieve this effect, each layer of the protocol stack in the source station typically adds information (in the form of a header) to the data generated by the sending process as the data descends the stack.

For example, the internetwork layer encapsulates data presented to it by the transport layer within a packet having a network layer header. The network layer header contains, among other information, source and destination network addresses needed to complete the data transfer. The data link layer, in turn, encapsulates the packet in a frame, such as a conventional Ethernet frame, that includes a data link layer header containing information, such as MAC addresses, required to complete the data link functions. At the destination station, these encapsulated headers are stripped off one-by-one as the frame propagates up the layers of the stack until it arrives at the receiving process.

Increases in the frame/packet transfer speed of an intermediate station are typically achieved through hardware enhancements for implementing well-defined algorithms, such as bridging, switching and routing algorithms associated with the predefined protocols. Hardware implementation of such an algorithm is typically faster than software because operations can execute in parallel more efficiently. In contrast, software implementation of the algorithm on a general-purpose processor generally performs the tasks sequentially because there is only one execution path. Parallel processing of conventional data communications algorithms is not easily implemented with such a processor, so hardware processing engines are typically developed and implemented in application specific integrated circuits (ASIC) to perform various tasks of an operation at the same time. These ASIC solutions, which are generally registers and combinational logic configured as sequential logic circuits or state machines, distinguish themselves by speed and the incorporation of additional requirements beyond those of the basic algorithm functions. However, the development process for such an engine is time consuming and expensive and, if the requirements change, inefficient since a typical solution to a changing requirement is to develop a new ASIC.

Thus, an object of the present invention is to provide a processor architecture for an intermediate station that approaches the speed of an ASIC solution but with the flexibility of a general-purpose processor.

Another object of the present invention is to provide a processing engine having a plurality of processing elements that efficiently execute conventional network service algorithms.

Still another object of the present invention is to provide a system for reducing the latency involved in transferring intermediate result information among processor elements of a pipelined processing engine.

Still yet another object of the invention is to provide a system that improves the efficiency of asynchronous instruction code execution among processor element stages of a pipelined processing engine.

SUMMARY OF THE INVENTION

The present invention relates to a system that facilitates fast context switching among processor complex stages of a pipelined processing engine. Each processor complex comprises a central processing unit (CPU) core coupled to an instruction memory via a memory manager circuit. The CPU core includes a plurality of internal context switchable registers that are connected to respective registers within CPU cores of the pipelined stages by a processor bus. The memory manager manages interactions among the components of the processor complex by, inter alia, mapping a contiguous address space viewed by the CPU to the contents of the various registers and memories residing internal/external to the CPU.

In the illustrative embodiment, the context switchable registers store intermediate results as values that are immediately accessible by the CPU in response to a context switch. According to the invention, a technique is provided that enables fast context switching by "sharing" the context switchable registers between upstream and downstream CPUs to, inter alia, shadow upstream register values into the downstream registers. In one aspect of the inventive technique, the system automatically reflects ("shadows") the contents of an upstream CPU's context switchable registers at respective registers of a downstream CPU over the processor bus. Shadowing generally occurs in response to updates to register values by an upstream CPU during instruction execution so that when a context switch occurs, the downstream CPU has immediate access to the register values.

In another aspect of the invention, the system redirects instruction execution by the downstream CPU to an appropriate routine based on processing performed by the upstream CPU. Here, an intermediate result that is "learned" by an upstream CPU during program execution may be a value that references a particular program/routine. Prior to a context switch, the system forces this program counter value into an appropriate register of a downstream CPU of the pipeline to facilitate processing by the downstream CPU in accordance with instructions stored in the instruction memory.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
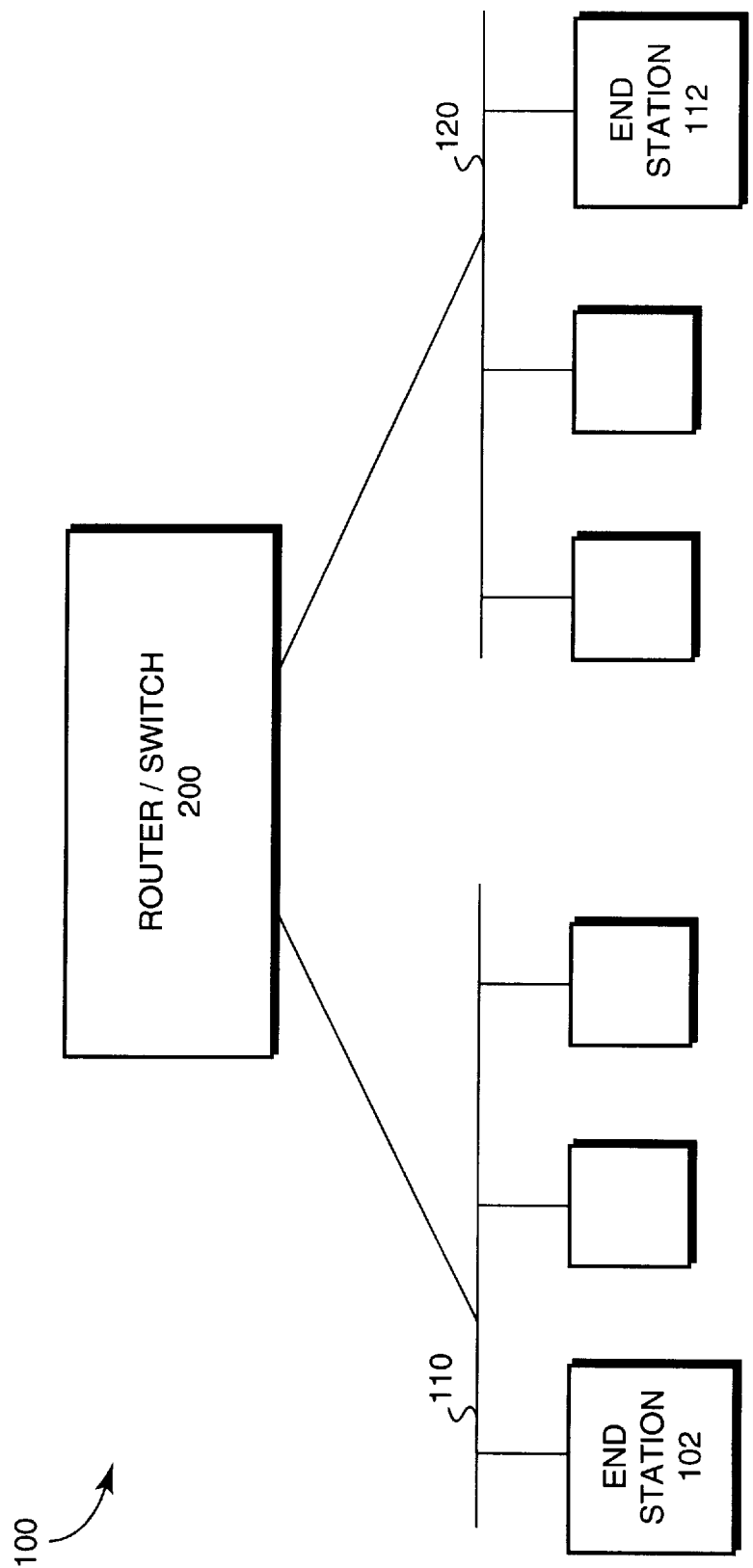
FIG. 1 is a block diagram of a computer network comprising a collection of interconnected communication media and subnetworks attached to a plurality of stations.

FIG. 1 is a block diagram of a computer network 100 comprising a collection of interconnected communication media and subnetworks attached to a plurality of stations. The stations are typically computers comprising end stations 102, 112 and intermediate station 200. The intermediate station 200 may be a router or a network switch, whereas the end stations 102, 112 may include personal computers or workstations. The subnetworks generally comprise local area networks (LANs) 110 and 120, although the invention may work advantageously with other communication media configurations such as point-to-point network links. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange protocol, AppleTalk protocol or DECNet protocol.

Figure 2:
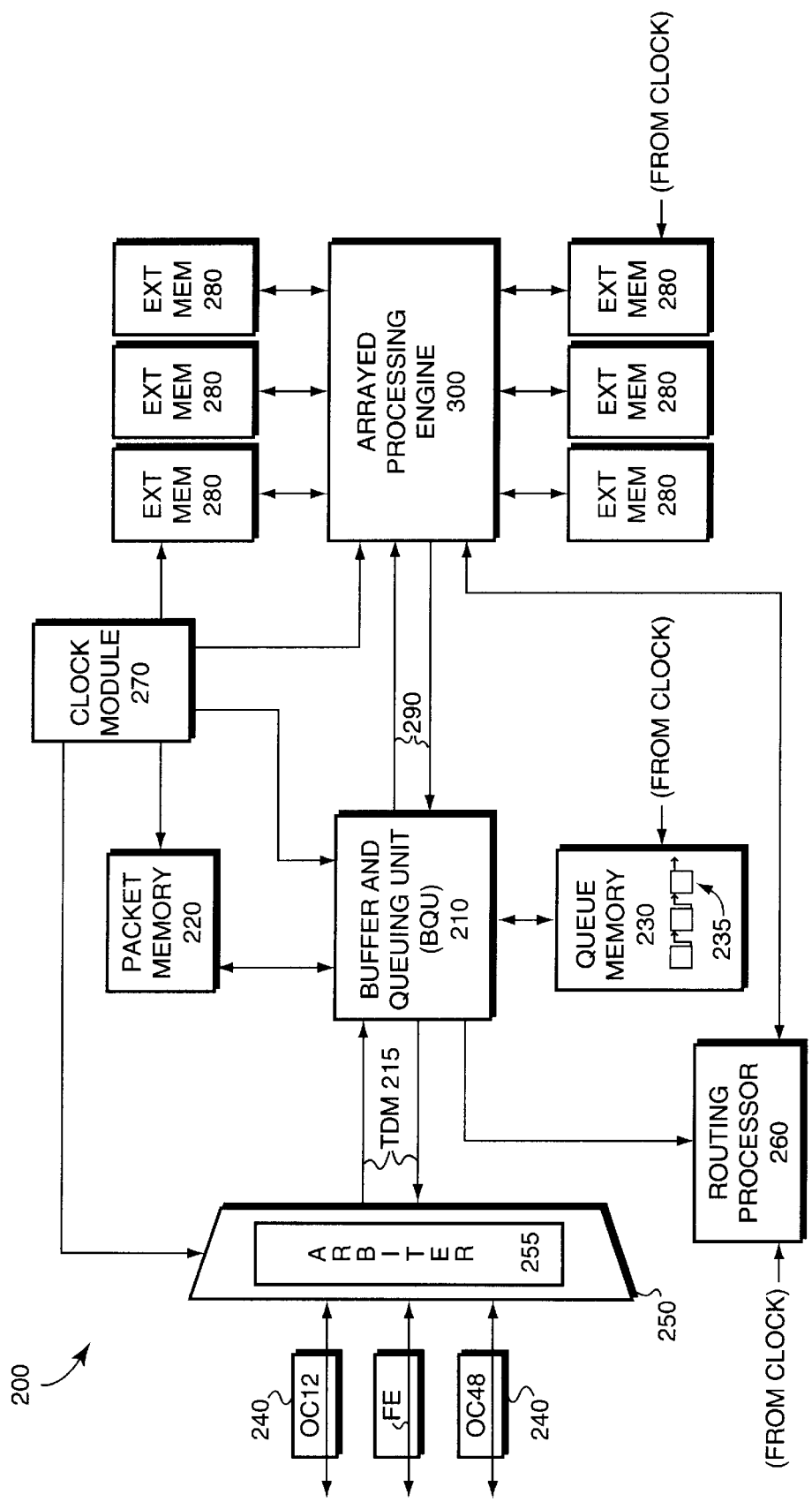
FIG. 2 is a schematic block diagram of intermediate station, such as a network switch, that may be advantageously used with the present invention.

FIG. 2 is a schematic block diagram of intermediate station 200 which, in the illustrative embodiment, is preferably a network switch. The switch generally performs layer 2 processing functions, such as "cut-through" operations wherein an entire frame does not have to be stored before transfer to a destination; in addition, switch 200 may implement layer 3 forwarding operations. It should be noted, however, that the intermediate station may also be configured as a router to perform layer 3 route processing. A feature of the inventive architecture described herein is the ability to program the station for execution of either layer 2 and layer 3 operations. To that end, operation of the switch will be described with respect to IP switching of packets, although the switch may be programmed for other applications, such as data compression and encryption.

The switch 200 comprises a plurality of interconnected components including an arrayed processing engine 300, various memories, queueing logic 210 and network port interface cards 240. Operations of these components are preferably synchronously controlled by a clock module 270 although the arrayed elements of the processing engine may be operatively configured to function asynchronously. In the illustrative embodiment, the clock module 270 generates clock signals at a frequency of 200 megahertz (i.e., 5 nanosecond clock cycles) and globally distributes them via clock lines to the components of the switch.

The memories generally comprise random access memory (RAM) storage locations addressable by the processing engine and logic for storing software programs and data structures accessed by the components. An operating system, portions of which are typically resident in memory and executed by the engine, functionally organizes the switch by, inter alia, invoking network operations in support of software processes executing on the switch. It will be apparent to those skilled in the art that other memory means, including various computer readable media, may be used for storing and executing program instructions pertaining to the operation of the switch.

The arrayed processing engine 300 is coupled to a memory partitioned into a plurality of external memory (Ext Mem) resources 280. A buffer and queuing unit (BQU) 210 is connected to a packet memory 220 for storing packets and a queue memory 230 for storing network layer headers of the packets on data structures, such as linked lists, organized as queues 235. The BQU 210 further comprises data interface circuitry for interconnecting the processing engine with a plurality of line cards 240 via a selector circuit 250. The line cards 240 may comprise OC12, OC48 and Fast Ethernet (FE) ports, each of which includes conventional interface circuitry that incorporates the signal, electrical and mechanical characteristics, and interchange circuits, needed to interface with the physical media and protocols running over that media. A typical configuration of the switch may include many (e.g., thousands) input/output channels on these interfaces, each of which is associated with at least one queue 235 in the queue memory 230. The processing engine 300 generally functions as a switching processor that modifies packets and/or headers in sequence as the BQU 210 implements queuing operations.

A route processor (RP) 260 executes conventional routing protocols for communication directly with the processing engine 300. The routing protocols generally comprise topological information exchanges between intermediate stations to determine optimal paths through the network based on, e.g., destination IP addresses. These protocols provide information used by the RP 260 to create and maintain routing tables. The tables are loaded into the external partitioned memories 280 as forwarding information base (FIB) tables used by the processing engine to perform forwarding operations. When processing a header in accordance with IP switching, the engine 300 determines where to send the packet by indexing into the FIB using an IP address of the header. Execution of the forwarding operations results in destination media access control (MAC) addresses of the headers being rewritten by the processing engine to identify output ports for the packets.

Figure 3:
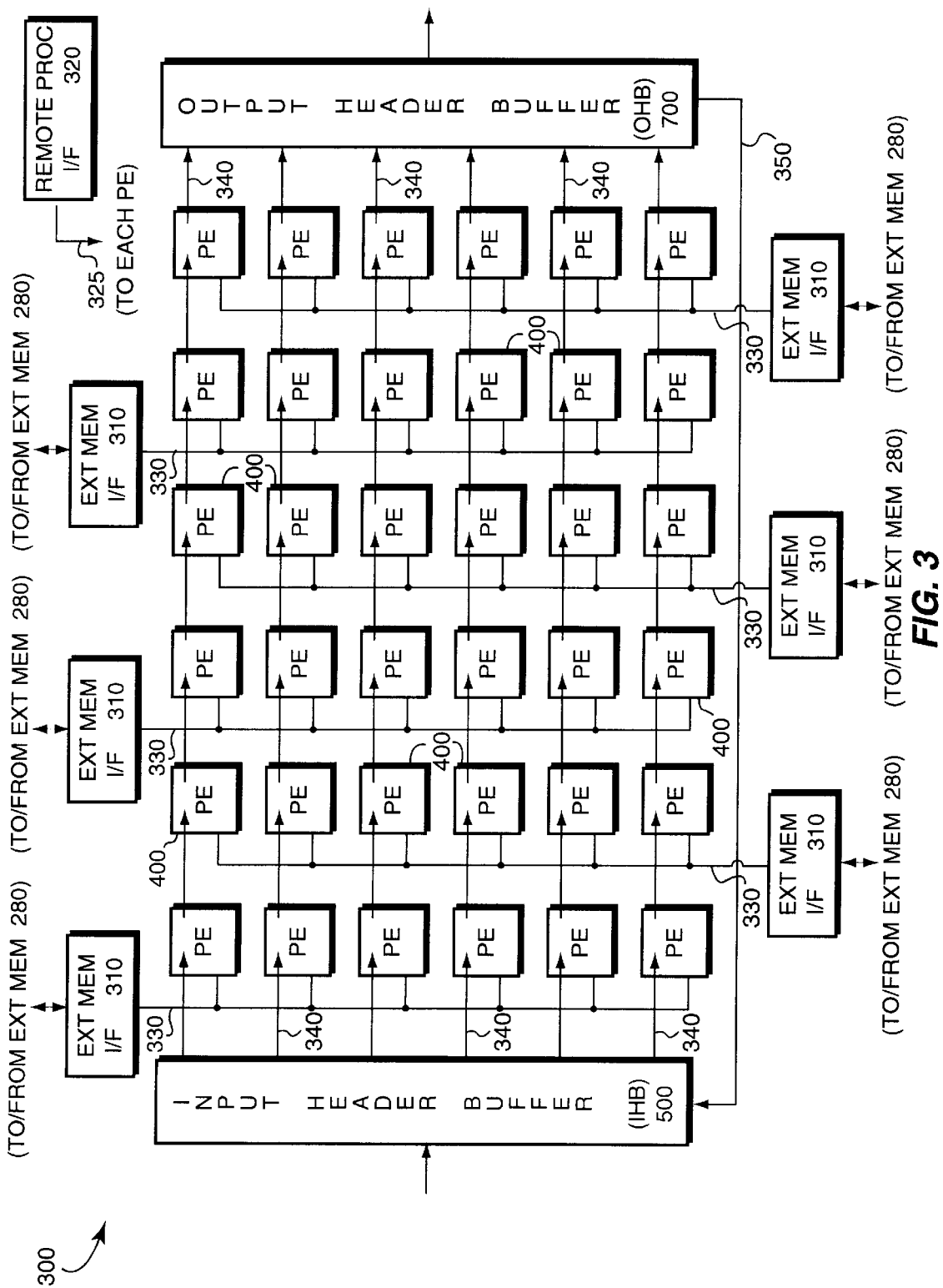
FIG. 3 is a schematic block diagram of a programmable arrayed processing engine having a plurality of processor complex elements.

FIG. 3 is a schematic block diagram of the programmable processing engine 300 which generally comprises an array of processing elements embedded between input and output header buffers with a plurality of interfaces from the array to an external memory. The external memory stores non-transient data organized within data structures for use in processing the transient data. The non-transient data typically includes "table" data contained in forwarding and routing tables, statistics, compression dictionaries, access filters, encryption keys and/or queuing information. Transient data enters and exists the engine via 200 MHz 128-bit input and output data interfaces of the BQU 210. Each processing element contains an instruction memory that allows programming of the array to process the transient data as baseline or extended pipelines operating in parallel. A remote processor interface (I/F) 320 provides instructions from a remote processor (not shown) to the PEs over a 32-bit maintenance bus 325 having multiplexed address/data lines for storage in their instruction memories.

In the illustrative embodiment, the processing engine 300 comprises a plurality of processing elements (PE) 400 symmetrically arrayed as six (6) rows and six (6) columns in a 6×6 arrayed configuration that is embedded between an input header buffer (IHB) 500 and an output header buffer (OHB) 700. A 64-bit feedback path 350 couples the OHB 700 to the IHB 500 and provides a data path for recycling data through the PE stages of the processing engine. The PEs of each row are configured as stages connected in series by a 100 MHz 64-bit direct memory access (DMA) data path 340 that synchronously transfers data and control "context" from one PE to the next. Specifically, the processing elements of each row are configured as stages of a pipeline that sequentially execute operations on the transient data loaded by the IHB 500, whereas the processing elements of each column operate in parallel to perform substantially the same operation on the transient data, but with a shifted phase. An example of an arrayed processing engine and network switch suitable for use with the present invention is described in copending and commonly-owned U.S. patent application Ser. No. (112025-77) titled Programmable Arrayed Processing Engine Architecture for a Net work Switch, which application is hereby incorporated by reference as though fully set forth herein.

As described further herein, sequencing circuitry of the IHB 500 controls the processing element stages of each pipeline by ensuring that each stage completes processing of current transient data prior to loading new transient data into the pipeline stages at a new phase. In general, a new phase of processing is started, i.e., a context switch is performed, when all of the PE stages finish processing their current context and new, incoming context is completely received by the IHB. An example of a system for controlling phase processing that is suitable for use with the present invention is described in copending and commonly-owned U.S. patent application Ser. No. (112025-84) titled Synchronization and Control System for an Arrayed Processing Engine, which application is hereby incorporated by reference as though fully set forth herein.

Figure 4:
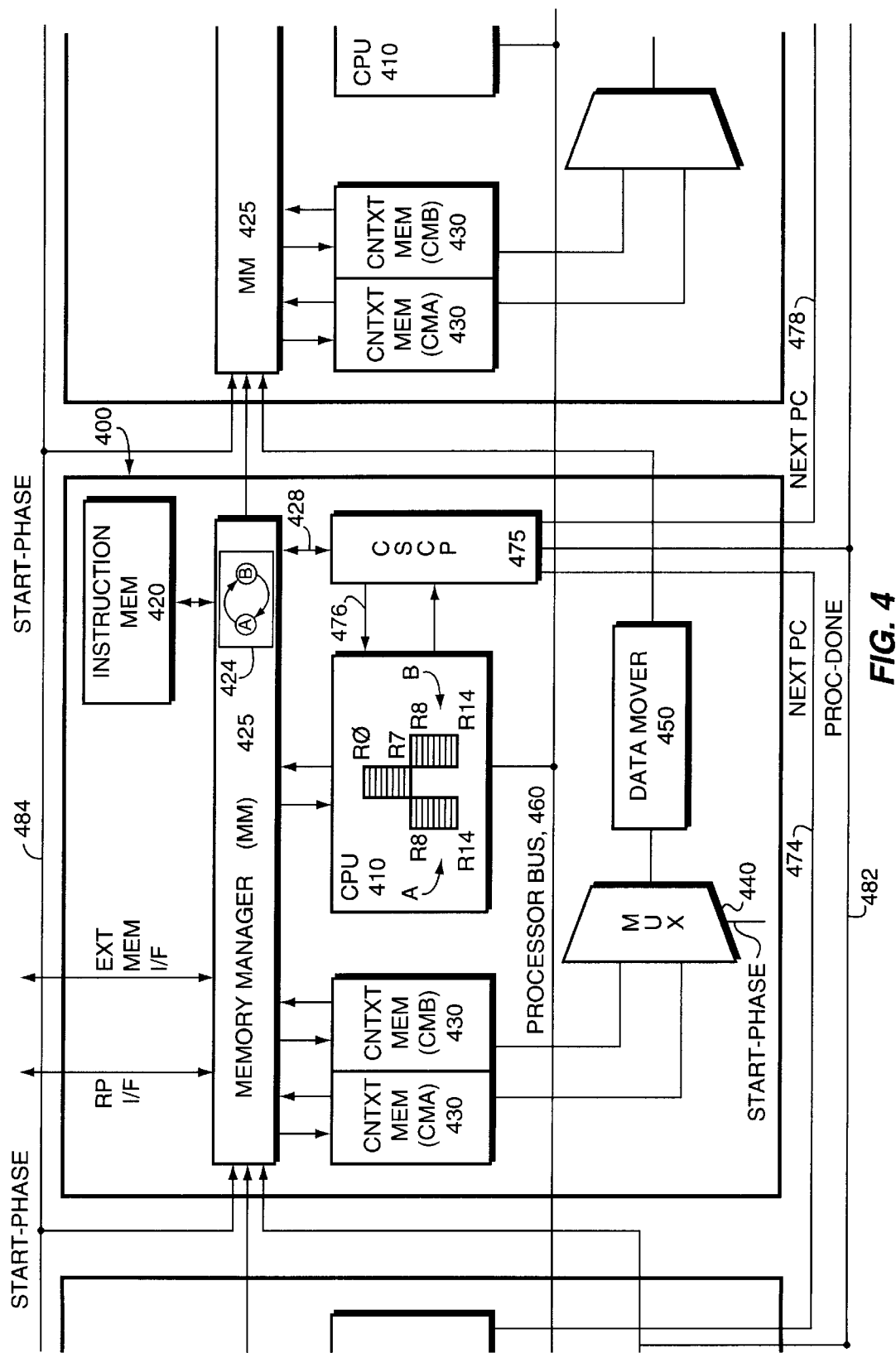
FIG. 4 is a schematic block diagram of a processor complex element comprising a central processing unit (CPU) having context switchable registers in accordance with the present invention.

FIG. 4 is a schematic block diagram of a PE 400. The PE is a processor complex that preferably comprises a central processing unit (CPU) core 410 coupled to an instruction memory 420 and a pair of context data memory (Cntxt Mem) structures 430 via a memory manager (MM) circuit 425. The context memories store transient data, such as frame/packet headers and/or data, for processing by the CPU in accordance with instructions stored in the instruction memory, which is preferably a 4 K×32 single port synchronous random access memory device. The MM 425 provides the instructions and data to the CPU in response to requests for that information. The MM also provides an interface to an external memory resource configured to store non-transient data, such as table data, for use by the CPU.

The CPU 410 is preferably a small processor core having a dense structure which enables implementation of similar cores on an application specific integrated circuit (ASIC). In the illustrative embodiment described herein, the CPU is a 32-bit, 100 MHz Advanced RISC Machine (ARM) 7TDI core capable of executing 16-bit or 32-bit instructions; however, it will be apparent to those skilled in the art that other CPU cores may be advantageously used with the processor complex architecture described herein. The ARM CPU includes an arithmetic logic unit (ALU, not shown), a plurality of 32-bit internal registers R0–R14 for storing information processed by the ALU, and an instruction fetch and decode unit (not shown) that decodes instructions fetched from the instruction memory. The instructions are generally vertical assembly language code manifested in the form of conventional reduced instruction set computer (RISC) instructions.

The internal registers R0–R14 store data, instructions, control or any type of information that may also be stored in the context memories. The registers are arranged into a common set of registers (R0–R7) and two sets of context switchable registers (R8–R14). Each set of context switchable registers R8–R14 is associated with a phase (e.g., Phase A and B) and contain state information which is passed from CPU to CPU. Each register set is further associated with a context memory 430. For example, the Phase A (A) register set R8–R14 may be associated with CMA (for manipulation during phase A) and the Phase B (B) register set R8–R14 may be associated with CMB (for manipulation during phase B). On the other hand, the common set of registers R0–R7 generally contain state information maintained within each CPU from phase to phase. For example, R0 may contain a timestamp value that is written by the CPU and maintained for use by the CPU during its next operation.

Each context memory 430 is preferably a 16×64 dual port, byte writable register file containing data for processing by the CPU 410. One context memory (CMA) is associated with a phase A context and the other (CMB) is associated with a phase B context. During a current pipeline phase, the CPU accesses data from its current context, which may be alternately stored in CMA and CMB. Any modification of context data is written to the current context memory as well as to the downstream complex's next context memory (e.g., current context memory CMA and downstream context memory CMB).

The MM 425 comprises logic circuitry that provides the electrical, mechanical and data signaling needed to interface to a memory bus coupling the processor complex and external memory. The manager further includes data path and control logic for managing the interactions of the individual components within the processor complex. For example, memory manager contains circuitry for mapping a "flat" 4 Gb contiguous memory address space viewed by the CPU 410 to the contents of various physical memories residing internal and external to the processor complex (e.g., instructions stored in memory 420, transient data stored in context memories 430, information stored in the internal control registers R0–R14 and non-transient data, such as forwarding information base (FIB) table data, stored in the external partitioned memory). The memory manager 425 handles read/write requests to the internal registers R0–R14 over the RP interface; in addition, the manager interfaces with at least one coprocessor to assist in context switching, as described herein.

The MM 425 further contains a state machine 424 that determines the current phase (A or B) to which all CPUs of the processing engine are synchronized; as noted, the current phase specifies from which context memory (CMA or CMB) the CPU processes data. The MM 425 broadcasts the current phase to the coprocessor coupled to each CPU via a level-sensitive control signal switch_reg_file over line 428. Each coprocessor responds to the level-sensitive signal by specifying a set of context switchable registers for use by the CPU during the next phase. For example, if the register file signal is "0", the coprocessor may instruct the CPU (over line 476) to use the Phase A register set whereas if the signal is an asserted "1", the CPU may be instructed to operate on the Phase B register set.

The PE 400 also comprises a data mover circuit 450 that cooperates with the context memories 430 and MM 425 to efficiently pass data among the PE stages of the processing engine. The data mover 450 generally comprises an address incrementor and interface logic, coupled to a multiplexer 440, that retrieves context data from a current context memory and loads it into a context memory of an adjacent "downstream" processor complex of the pipeline. For example, in phase A, the CPU fetches data from CMA while the data mover moves data from CMA to a downstream CMB. Data that the CPU has processed from CMA is written back into CMA and into the downstream CMB. In the illustrative embodiment, data transfers between context memories take place over the memory manager data paths; that is, transfers from the CPU to the downstream context memories and from the data mover to the downstream context memories are all via the memory manager. The data mover further comprises a context size register that specifies a context size (number of 64-bit words or number of cycles) of data to be moved to the available downstream context memory 430.

Data coherency is maintained by the memory manager constantly "snooping" the data mover 450 and CPU core 410 "behind-the-scene" to determine the state of the context data accessed by the data mover and CPU. Notably, the CPU 410 may operate on the transient data substantially simultaneously with the passing of that data by the data mover 450. After data in the current context memory (e.g., CMA) is processed by the CPU 410, the CPU writes the processed data to the downstream context memory (CMB); meanwhile, the data mover 450 transparently passes the data from CMA to the downstream CMB. At the end of the current phase, the context memories are switched so that the CPU operates on the data in CMB. In the event of write collisions between the CPU and data mover to a same context location, the MM 425 ensures that the CPU takes precedence and exclusively accesses the data item.

According to the invention, a system and technique is provided that facilitates fast context switching among processor complex stages of a pipelined processing engine by "sharing" the context switchable registers between upstream and downstream CPUs to, inter alia, shadow upstream register values into the downstream registers. Each CPU is coupled to a processor bus 460 having a 32-bit data path for transferring information among the CPUs. The processor bus 460 includes data/address/control lines that provide context addressing for internal registers R8 through R14 when transferring data among those context switchable registers.

In the illustrative embodiment, the context switchable registers of an upstream CPU store intermediate results as values that are immediately accessible by a downstream CPU in response to a context switch. The intermediate result values reflect meaningful work performed by an upstream CPU that is passed to a downstream CPU so that upon a context switch, the downstream CPU can immediately operate on the register values. The internal context switchable registers are preferably used as "scratch pad" space for storing these intermediate results as context learned by an upstream CPU and passed to a downstream CPU; however, the invention may be extended to enable storage of data along with intermediate results within the internal registers, provided that there is sufficient register space within the CPU core.

As an example, assume an upstream CPU performs a look-up operation into a binary tree data structure organized within the external memory. The CPU performs the lookup operation and stores an intermediate pointer to the tree into the bottom portion of its context memory for transfer by the data mover to a downstream context memory. After context shift, the downstream CPU performs a load operation to move the pointer into one of its registers for execution of another lookup operation into the tree using the pointer. The load and store operations consume CPU cycles as overhead for both the current and downstream CPUs; thus it would be desirable if those cycles could be eliminated. The present invention obviates the need for such store and load operations by enabling the upstream CPU to update the internal register of the downstream CPU with this intermediate pointer result over the processor bus.

In one aspect of the inventive technique, the system automatically reflects ("shadows") the contents of an upstream CPU's context switchable registers R8–R14 at respective registers of a downstream CPU over the processor bus 460. Shadowing generally occurs in response to updates to register values by an upstream CPU during instruction execution so that when a context switch occurs, the downstream CPU has immediate access to the register values. Specifically, the processor bus 460 is used to update the context switchable registers using a write_enable control signal that, when asserted, specifies loading of the values present on the data lines of the bus at the specified address. Thus, as the data mover 450 moves information between context memories 430, the processor bus shadows the internal context switchable registers between an upstream and downstream CPU. In fact each time the upstream CPU writes to one of its internal registers, an update occurs to a respective downstream register.

In another aspect of the invention, the system redirects instruction execution by the downstream CPU to an appropriate routine based on processing performed by the upstream CPU. Here, an intermediate result that is "learned" by an upstream CPU during program execution may be a (counter) value that points to (i.e., references) a particular program/routine. The program counter value is an indication of the address/routine from which the downstream CPU fetches instructions (from the instruction memory) for execution. Prior to a context switch, the system forces this program counter value into an appropriate register of the downstream CPU of the pipeline to facilitate processing by the downstream CPU in accordance with instructions stored in the instruction memory.

Operation of the system to efficiently switch context among processor complex elements of a pipelined processing engine will now be described in connection with drawings. At the beginning of each phase, each CPU 410 performs one of the subtasks stored in the instruction memory 420, reads data from one of the two upstream context memories 430 to which it has access, loads the data into its internal registers for processing and writes the processed data from the registers to one of the two downstream context memories to which it has access. As noted, each time an upstream CPU writes to one of its internal context switchable registers R8-R14, an updated value is transferred over the processor bus 460 to a respective register in the downstream CPU. Simultaneously, the contents of an upstream context memory are moved to a downstream context memory by data mover 450, transparent to the upstream CPU.

As each upstream CPU executes instructions of a routine to process data in its respective context memory (e.g., CMA) during a phase, it encounters a context switch instruction, such as a Coprocessor Data Operation (CDP) instruction. Context switching commences when each CPU 410 has finished its task and has issued the CDP instruction that is decoded by a context switch coprocessor (CSCP) 475 coupled to the CPU. At the end of the phase, the context switchable register set manipulated by the CPU alternates as context for each processor complex is switched to the alternate upstream and downstream context memories, and a new phase begins. All CPUs 410 of the engine 300 are synchronized with either phase A or B; as noted, the phase determines from which context memory (CMA or CMB) and internal register set (A or B) the CPU fetches data.

During a context switch, the memory manager switches the CPU from one context memory to another as the CSCP switches the CPU from one context switchable register set to the other. For example in phase A, the internal register set associated with phase A is used for storing information associated with CMA (and vice versa). As each CPU completes its task for a particular phase, it issues a CDP instruction (3rd from last instruction in a subroutine) to the CSCP 475. The CDP instruction contains the program counter (or a vector into a table) to be passed to a downstream CSCP, along with a context switch control field (CF) that is updated appropriately. As described herein, only the last CPU in a row sets bits in the CF. Upon receiving the CDP instruction, the CSCP asserts a proc_done signal over line 482 to the IHB signalling completion of the current phase. At this point, each CSCP (except for the last CSCP of a row) stalls the CPU (by, e.g., asserting a halt signal) and waits for two events to occur: receipt of a new program counter from the upstream CSCP and assertion of start_ phase over line 484 by the IHB 500. In response to these events, the CSCP de-asserts the halt signal and forces the program counter into the CPU as a new phase begins.

Figure 5:
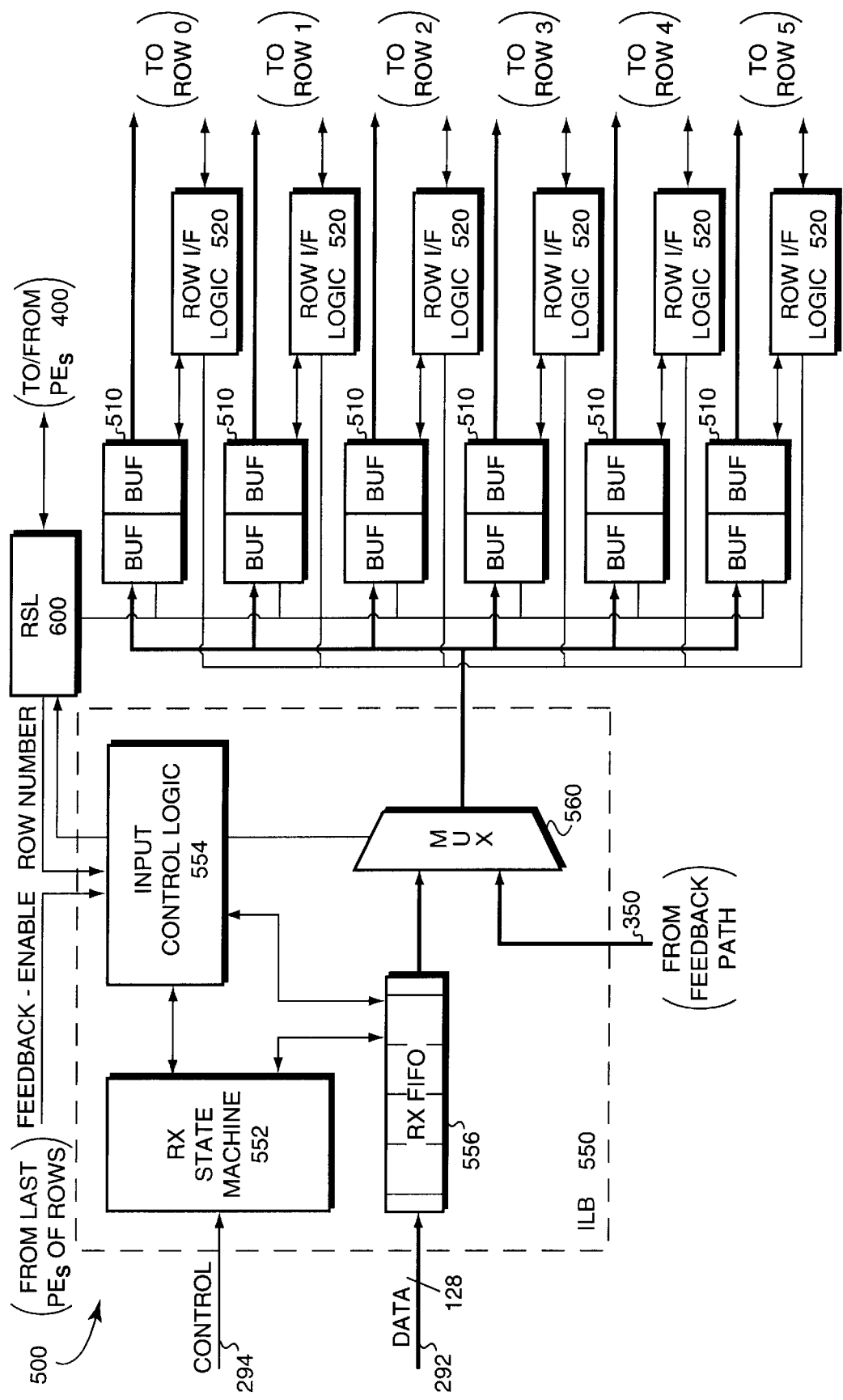
FIG. 5 is a schematic block diagram of an input header buffer (IHB) of the programmable arrayed processing engine.

FIG. 5 is a schematic block diagram of the IHB 500 which functions as a sequencer to control the PE stages of the processing engine such that the columned PEs may performs their operations at staggered, shifted phases with respect to each other. To that end, a new phase for each row is started by the IHB when all of the PE stages finish processing their current context and either new, incoming context is completely received for that row from the data interface or feedback path or a configurable minimum number of cycles has elapsed since the previous row shifted its phase. The IHB 500 receives data context from either the data interface of the BQU 210 or from the feedback path 350 and provides the context to each pipeline in succession with feedback data context generally having priority over incoming data context. The data interface preferably includes a path 290 comprising a 128-bit data portion 292 and a control portion 294 for transferring predetermined control signals that manage the flow of data to (and from) the engine. Broadly stated, the IHB advances a pipeline row and begins moving a new packet header or context to a first stage of a next row in response to completion signals from all stages of that row. In the illustrative embodiment, each pipeline row generally advances at a configurable offset from the phase shift of a previous row, so that if one pipeline row stalls, then subsequent pipeline rows may stall as well. This is significant to maintaining packet sequencing.

The IHB 500 comprises a plurality of buffer pairs (BUF 510), similar to the context memories 430 of a processor complex element 400, with each pair associated with a pipeline row. As transient data enters the engine, it is sequentially loaded into one of the paired buffers 510 for a particular row before being dispatched to a first stage of that row. The IHB presents a context-in/context-out interface (row I/F logic 520) that provides write enable, data and address signals to and from the buffers and context memories; preferably, the logic 520 is substantially identical to the data mover 450 of each PE 400. This enables the processing engine to scale efficiently, thereby allowing the pipelines to be as "deep" as desired.

The IHB also includes an input logic block (ILB 550) comprising a receive (Rx) state machine 552 coupled to an input control logic circuit 554 and an input buffer 556. The input buffer is preferably organized as a first-in, first-out (Rx FIFO) buffer that sequentially receives and transmits data forwarded to the engine by the BQU 210. The Rx state machine receives the predetermined control signals over path 294 and cooperates with the logic 554 to control the transfer of data from FIFO 556. In addition, the logic circuit 554 controls a multiplexer 560 having inputs coupled to an output of the FIFO and the feedback path 350. The logic 554 enables the multiplexer to select one of its inputs in response to a control signal (feedback_enable) provided by the last PE stages of the pipelines. Furthermore, the logic 554 generates write enable signals (in response to a control signal provided by row synchronization logic 600) and buffer addresses that enable the row I/F logic 520 to transfer the contents of the buffers 510.

Figure 6:
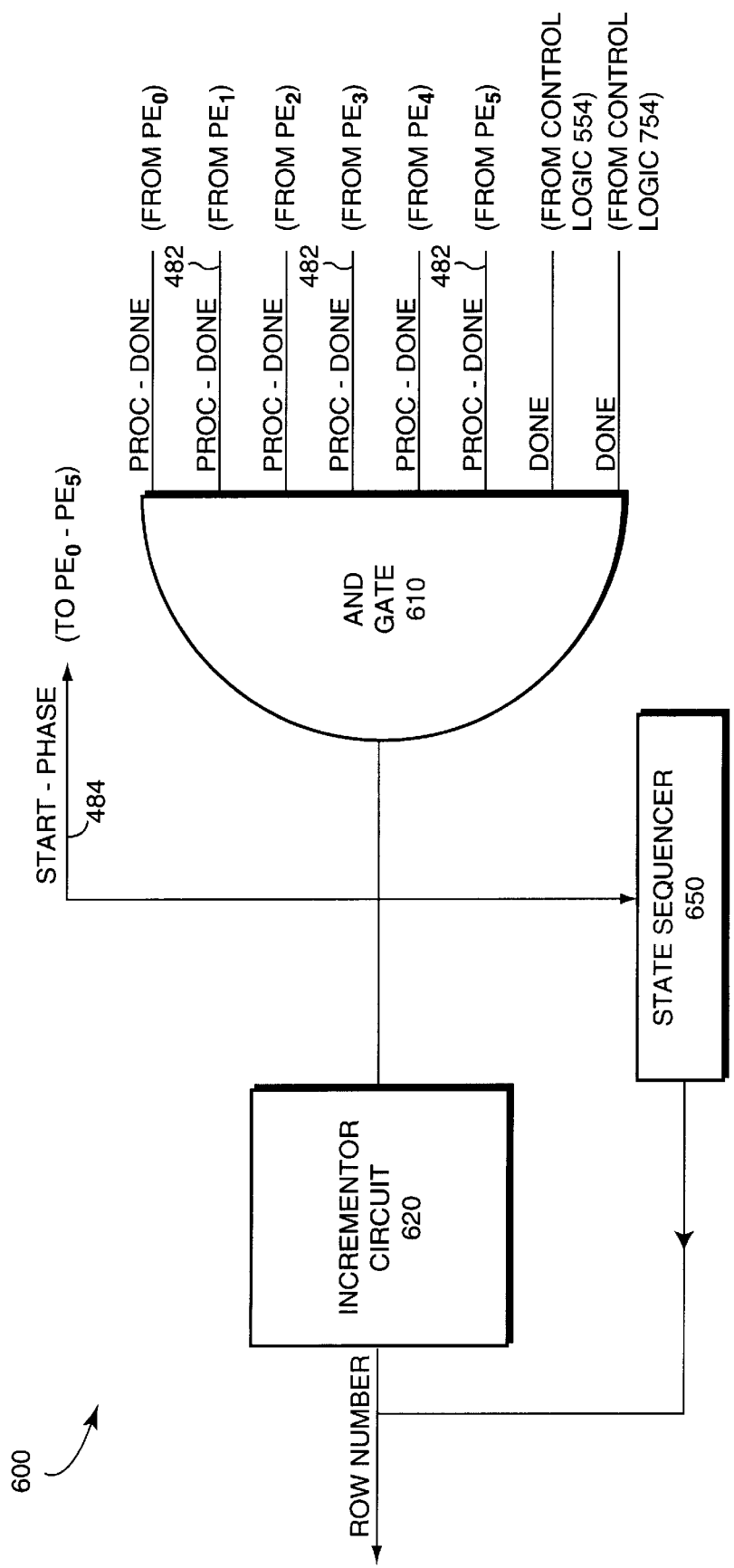
FIG. 6 is a schematic block diagram of a row synchronization logic circuit of the IHB.

FIG. 6 is a schematic block diagram of row synchronization logic (RSL) 600 that controls the pipelines by ensuring that each PE stage completes its processing of current context prior to loading new context at a new phase. To that end, the RSL comprises logic circuitry associated with each pipeline row of the arrayed processing engine. For ease of depiction, circuitry associated with one row will be described, although it will be understood to those skilled in the art that the circuitry associated with the other rows are substantially similar.

The RSL 600 receives processing completion status from each PE stage prior to Is advancing the pipelines. Specifically as each PE 400 finishes its task, it asserts a global pipeline completion signal (proc_done) over lines 482 that is collected by a logic circuit, schematically shown as an AND gate 610. Other completion signals (done) are provided as inputs to the gate from the control logic 554, 754. In response to assertion of all completion signals, the gate 610 generates a beginning of next phase signal (start_phase) over line 484. The start_phase signal informs each PE stage that there is valid context data in its context memory that its CPU core can begin processing. In addition, start_phase signal is transformed by an incrementor circuit 620 into incremented row number, while being analyzed by a state sequencer circuit 650 prior to being fed to the input control logic 554.

Figure 7:
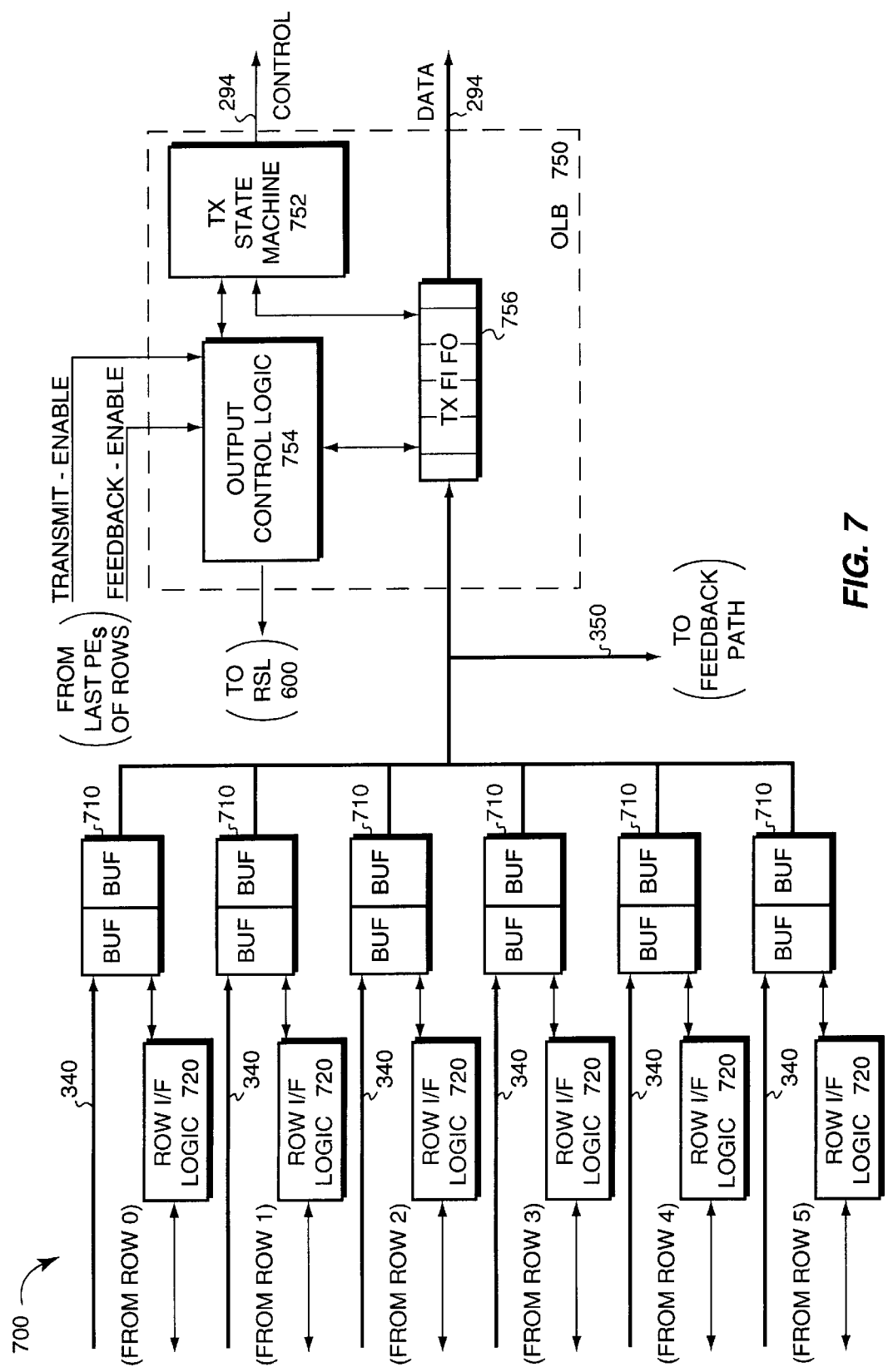
FIG. 7 is a schematic block diagram of an output header buffer of the programmable arrayed processing engine.

Upon completion of processing by all of its stages, a pipeline row is selected to deliver its data to the OHB 700 in a synchronous manner. FIG. 7 is a schematic block diagram of the OHB 700 whose internals are substantially similar as those of the IHB 500. That is, the OHB comprises a plurality of buffer pairs (BUF 710), each of which is associated with a pipeline row for receiving data processed by the row. Row I/F logic 720 provides write enable, data and address signals to and from the buffers and context memories of the PEs. In addition, the OHB includes an output logic block (OLB 750) comprising a transmit (Tx) state machine 752 coupled to an output control logic circuit 754 and an output buffer organized as a Tx FIFO 756 that sequentially transfers data from the engine to the BQU 210.

Referring again to FIG. 4, the CSCP 475 synchronizes context switching with all processor complex elements of a pipeline row by managing phase starts, stops and stalls within the processor complex. In addition, the CSCP passes a program counter to a downstream CSCP (and receives a program counter from an upstream CSCP). The last CSCP in a row indicates to the OHB 700 via the CF how to handle the context from the last CPU in a row: transmit context out the engine, feedback context to a next available row for further processing, transmit and feedback (for multicasts) or neither (discard).

The CDP instruction is also used to convey other information from the CPU to both its CSCP and the downstream CSCP, such as the next code entry point or a prefetch address for the downstream CPU's next task. Each upstream CPU has access to a vector table (not shown) for its respective downstream CPUs tasks so it knows the entry points for the routines that will be executed by the downstream CPU. Based on the operations it has performed, the upstream CPU can thus determine the particular routine that the downstream CPU will perform. Each upstream CPU loads the program counter for that particular routine into the CDP instruction and forwards the instruction to its CSCP 475.

Figure 8:
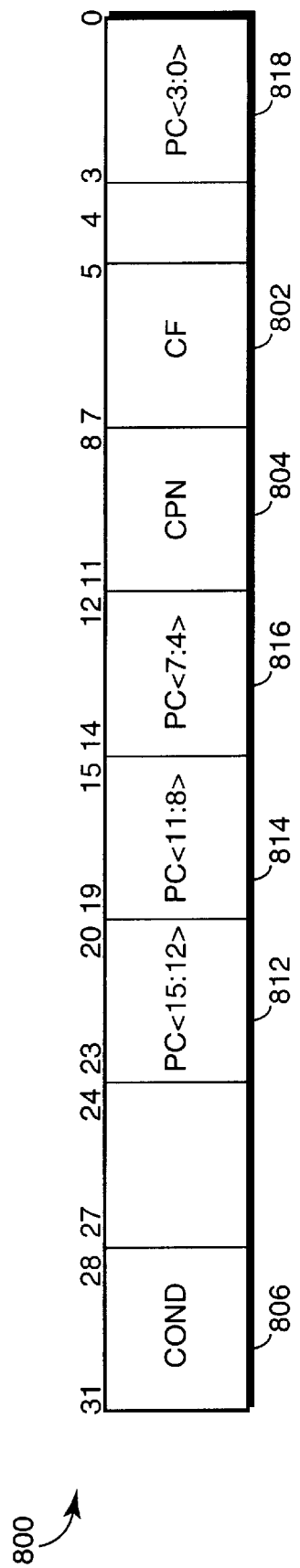
FIG. 8 is a schematic block diagram depicting the format of a context switch instruction that may be advantageously utilized with the context switchable registers of the present invention.

In response to receiving the context switch instruction, each CSCP immediately issues a busy signal to its CPU. The busy signal stalls each CPU (except for the last one to finish) while the CSCPs cooperate to switch context among the arrayed CPUs. Specifically, each CSCP (i) sends the program counter Next PC (or an index into a vector table) over line 478 to the downstream CSCP, (ii) monitors its own next program counter Next PC over line 474 to determine if a valid program counter (or index) is present on that line, and (iii) generates and sends a proc_done signal over line 482 to the IHB 500. FIG. 8 is a schematic block diagram depicting the format 800 of a CDP instruction containing a program counter (or index) that instructs the downstream CPU as to which subroutine to execute. As shown in the drawing, fields 812-818 contain the actual program counter bits <15:0>. In addition, CF field 802 contains context switch control bits that are manipulated by the last CPU in a pipeline, CPN field 804 contains a number of the coprocessor and COND field 806 contains various condition bits.

According to the inventive context switching technique, the IHB 500 cooperates with the CPU 410 to efficiently switch between internal register sets. In response to the start_phase command issued by the RSL 600 to each CSCP 475 signifying the beginning of a next phase, the CSCP de-asserts the busy signal and the CPU effectively switches context to Phase B by commencing processing of data in CMB in accordance with instructions of a routine specified by the program counter. As the context switchable registers are updated during data processing, the CPU shadows the contents of its internal registers with those of the downstream CPU. For example, assume an instruction specifies updating the contents of R10. In response to the update, the CPU drives the address of R10 over the processor bus 460 along with the updated data and then asserts write_enable which essentially copies that data into R10 of the downstream CPU.

While there has been shown and described an illustrative embodiment of a system and technique that facilitates fast context switching among processor complex stages of a pipelined processing engine, it is to be understood that various other adaptations and modifications may be made within the spirit and scope of the invention. For example, in an alternate embodiment of the invention, a control signal may be appended to the program counter (16 bits data, 1-bit valid) to indicate a valid program counter value on the bus. The valid signal is advantageously utilized because (i) the length of instruction code executed by each CPU may be different/variable and the asynchronous nature of such variable-length code execution does not always allow the CPUs of the array to switch context at the same time and (ii) the program counter value on the Next PC line is generally valid for only one cycle. When the program counter value is valid, the CSCP 475 forces (i.e., loads) that value into one of the internal registers of the CPU. The context switching invention thus addresses the asynchronous manner of code execution among the processor complexes by enabling a downstream CSCP to retarget its CPU by providing a valid program counter received from an upstream CSCP.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method that facilitates fast context switching among processor complex stages of a pipelined processing engine, each processor complex stage comprising a central processing unit (CPU) coupled to an instruction memory configured to store instructions of routines executed by the CPU, the processing engine including a processor bus coupling adjacent upstream and downstream CPUs of a pipeline, the method comprising the steps of:

providing a plurality of internal context switchable registers within each CPU, the context switchable registers storing values processed in accordance with the instruction routines executed by the CPU; and shadowing the values of the context switchable registers of the upstream CPU at respective context switchable registers of the downstream CPU in response to updates to the values during instruction execution by the upstream CPU such that when a context switch occurs, the downstream CPU has immediate access to the updated values.

2. The method of claim 1 further comprising the step of, wherein an updated value is a program counter referencing a particular routine, redirecting instruction execution by the downstream CPU to an appropriate routine based on the program counter shadowed in a respective context switchable register.

3. The method of claim 1 wherein the step of shadowing comprises the step of driving the updated values over the processor bus and into respective context switchable registers in response to assertion of a write enable control signal.

4. The method of claim 3 wherein the step shadowing further comprises the step of updating a downstream register each time the upstream CPU writes to a respective upstream register.

5. The method of claim 2 wherein the step of redirecting comprises the step of forcing the program counter value into the respective context switchable register of the downstream CPU to facilitate processing by the downstream CPU in accordance with instructions stored in the instruction memory.

6. Apparatus that facilitates fast context switching among processor complex stages of a pipelined processing engine, each processor complex stage comprising a central processing unit (CPU) coupled to an instruction memory configured to store instructions of routines executed by the CPU, the processing engine including an upstream CPU coupled to a downstream CPU of a pipeline, the apparatus comprising:

a plurality of internal context switchable registers within each CPU, the context switchable registers storing values processed in accordance with the instruction routines executed by the CPU; and means for shadowing the values of the context switchable registers of the upstream CPU at respective context switchable registers of the downstream CPU in response to updates to the values during instruction execution by the upstream CPU such that when a context switch occurs, the downstream CPU has immediate access to the updated values.

7. The apparatus of claim 6 wherein the means for shadowing comprises a processor bus interconnecting the upstream and downstream CPUs, the processor bus transporting the updated values to the respective context switchable registers in response to assertion of a control signal.

8. The apparatus of claim 7 wherein the control signal is a write enable control signal.

9. The apparatus of claim 8 further comprising a data mover cooperatively coupled to a plurality of context memories to pass data among the processor complex stages of the processing engine.

10. The apparatus of claim 6 further comprising, wherein an updated value is a program counter referencing a particular routine, means for redirecting instruction execution by the downstream CPU to an appropriate routine based on the program counter shadowed in a respective context switchable register.

11. The apparatus of claim 10 wherein the means for redirecting comprises means for forcing the program counter value into the respective context switchable register of the downstream CPU to facilitate processing by the downstream CPU in accordance with instructions stored in the instruction memory.

12. A computer readable medium containing executable program instructions for facilitating fast context switching among processor complex stages of a pipelined processing engine, each processor complex stage comprising a central processing unit (CPU) coupled to an instruction memory configured to store instructions of routines executed by the CPU, the processing engine including a processor bus coupling adjacent upstream and downstream CPUs of a pipeline, the executable program instructions comprising program instructions for:

providing a plurality of internal context switchable registers within each CPU, the context switchable registers storing values processed in accordance with the instruction routines executed by the CPU; and shadowing the values of the context switchable registers of the upstream CPU at respective context switchable registers of the downstream CPU in response to updates to the values during instruction execution by the upstream CPU such that when a context switch occurs, the downstream CPU has immediate access to the updated values.

13. The computer readable medium of claim 12 wherein the instruction for shadowing comprises the program instruction for driving the updated values over the processor bus and into respective context switchable registers in response to assertion of a write enable control signal.

14. The computer readable medium of claim 13 wherein the instruction for shadowing further comprises the program instruction for updating a downstream register each time the upstream CPU writes to a respective upstream register.

15. The computer readable medium of claim 12 further comprising program instructions for, wherein an updated value is a program counter referencing a particular routine, redirecting instruction execution by the downstream CPU to an appropriate routine based on the program counter shadowed in a respective context switchable register.

16. The computer readable medium of claim 15 wherein the instruction for redirecting comprises the program instruction for forcing the program counter value into the respective context switchable register of the downstream CPU to facilitate processing by the downstream CPU in accordance with instructions stored in the instruction memory.

* * * * *